(12) United States Patent
Liu et al.

(10) Patent No.: US 11,884,252 B2
(45) Date of Patent: Jan. 30, 2024

(54) ENHANCED THREAT ASSESSMENT (71) Applicant: Ford Global Technologies, LLC, Dearborn, MI (US)

(72) Inventors: Yuhao Liu, Canton, MI (US); Alex Maurice Miller, Canton, MI (US); Christopher Pontisakos, Allen Park, MI (US); Purushothaman Rayalsamy, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 630 days.

(21) Appl. No.: 16/555,517

(22) Filed: Aug. 29, 2019

(65) Prior Publication Data
US 2021/0061241 A1    Mar. 4, 2021

(51) Int. Cl.
*B60T 7/22* (2006.01)
*B60T 8/171* (2006.01)

(52) U.S. Cl.
CPC ................ *B60T 7/22* (2013.01); *B60T 8/171* (2013.01)

(58) Field of Classification Search
CPC .................................. B60T 7/22; B60T 8/171
See application file for complete search history.

(56) References Cited

U.S. PATENT DOCUMENTS

| 7,613,568 | B2 * | 11/2009 | Kawasaki | G01S 7/412 |
| | | | | 701/301 |
| 9,227,632 | B1 | 1/2016 | Lee | |
| 9,610,945 | B2 | 4/2017 | Miller et al. | |
| 10,665,107 | B2 * | 5/2020 | Matsunaga | G08G 1/166 |
| 10,737,665 | B2 * | 8/2020 | Seiler | B60T 7/12 |
| 2009/0121915 | A1 * | 5/2009 | Randler | G01S 13/931 |
| | | | | 342/70 |
| 2016/0152234 | A1 * | 6/2016 | Kim | B60W 10/184 |
| | | | | 701/41 |
| 2016/0362104 | A1 * | 12/2016 | Miller | B60W 30/08 |
| 2017/0341641 | A1 * | 11/2017 | Miller | G08G 1/164 |
| 2018/0099665 | A1 * | 4/2018 | You | G01S 13/931 |
| 2020/0118441 | A1 * | 4/2020 | Han | G06N 20/10 |

FOREIGN PATENT DOCUMENTS

| CN | 108257417 A | 7/2018 |
| CN | 109733394 A | 5/2019 |

* cited by examiner

*Primary Examiner* — Thomas Ingram
(74) *Attorney, Agent, or Firm* — Frank A. MacKenzie; Bejin Bieneman PLC (57) ABSTRACT

A computer includes a processor and a memory, the memory including instructions executable by the processor to predict a collision time between a corner point of a host vehicle and a target vehicle, predict a reach time for the corner point of the host vehicle to reach the target vehicle based on a predicted relative heading angle between the host vehicle and the target vehicle, and determine a threat number based on the lower of the collision time and the reach time.

19 Claims, 3 Drawing Sheets

ENHANCED THREAT ASSESSMENT

BACKGROUND

Vehicle collisions can occur at intersections of roadways. A vehicle can detect a target vehicle at the intersection. Collision mitigation, including assessing a threat posed to a host vehicle by a target vehicle may be difficult and expensive to implement. For example, assessing a target vehicle threat can require data from a plurality of sensors.

DETAILED DESCRIPTION

A computer includes a processor and a memory, the memory including instructions executable by the processor to predict a collision time between a corner point of a host vehicle and a target vehicle, predict a reach time for the corner point of the host vehicle to reach the target vehicle based on a predicted relative heading angle between the host vehicle and the target vehicle, and determine a threat number based on the lower of the collision time and the reach time.

The instructions can further include instructions to determine a longitudinal distance threshold based on the predicted relative heading angle and to predict the reach time based on the longitudinal distance threshold.

The instructions can further include instructions to predict respective collision times between a plurality of corner points of the host vehicle and a plurality of corner points of the target vehicle, to identify the corner point of the host vehicle having the lowest collision time with one of the corner points of the target vehicle, and to predict the reach time for the identified corner point of the host vehicle.

The instructions can further include instructions to determine the collision time based on a longitudinal distance between the corner point of the host vehicle and the target vehicle and a lateral distance between the corner point of the host vehicle and the target vehicle.

The instructions can further include instructions to predict the relative heading angle based on the collision time.

The instructions can further include instructions to actuate a brake based on the threat number.

The instructions can further include instructions to determine the collision time based on a yaw rate of the host vehicle.

The threat number can be one of a brake threat number or a steering threat number.

The instructions can further include instructions to determine the collision time between the corner point of the host vehicle and a corner point of the target vehicle.

The collision time can be a longitudinal collision time.

A method includes predicting a collision time between a corner point of a host vehicle and a target vehicle, predicting a reach time for the corner point of the host vehicle to reach the target vehicle based on a predicted relative heading angle between the host vehicle and the target vehicle, and determining a threat number based on the lower of the collision time and the reach time.

The method can further include determining a longitudinal distance threshold based on the predicted relative heading angle and to predict the reach time based on the longitudinal distance threshold.

The method can further include predicting respective collision times between a plurality of corner points of the host vehicle and a plurality of corner points of the target vehicle, identifying the corner point of the host vehicle having the lowest collision time with one of the corner points of the target vehicle, and predicting the reach time for the identified corner point of the host vehicle.

The method can further include determining the collision time based on a longitudinal distance between the corner point of the host vehicle and the target vehicle and a lateral distance between the corner point of the host vehicle and the target vehicle.

The method can further include predicting the relative heading angle based on the collision time.

The method can further include actuating a brake based on the threat number.

The method can further include determining the collision time based on a yaw rate of the host vehicle.

The method can further include determining the collision time between the corner point of the host vehicle and a corner point of the target vehicle.

A system includes a host vehicle including a brake, means for predicting a collision time between a corner point of the host vehicle and a target vehicle, predicting a reach time for the corner point of the host vehicle to reach the target vehicle based on a predicted relative heading angle between the host vehicle and the target vehicle, means for determining a threat number based on the lower of the collision time and the reach time, and means for actuating the brake based on the threat number.

The system can further include means for determining a longitudinal distance threshold based on the predicted relative heading angle and to predict the reach time based on the longitudinal distance threshold.

The system can further include means for predicting respective collision times between a plurality of corner points of the host vehicle and a plurality of corner points of the target vehicle, means for identifying the corner point of the host vehicle having the lowest collision time with one of the corner points of the target vehicle, and means for predicting the reach time for the identified corner point of the host vehicle.

The system can further include means for determining the collision time based on a longitudinal distance between the corner point of the host vehicle and the target vehicle and a lateral distance between the corner point of the host vehicle and the target vehicle.

The system can further include means for predicting the relative heading angle based on the collision time.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

Determining a collision threat based on a collision time and a reach time for a host vehicle to reach a target vehicle provides additional parameters that a computer of the host vehicle can use to mitigate a collision with the target vehicle. For example, determining a time for a corner point of the host vehicle to reach the target vehicle can provide a reach time that is lower than a collision time of a center point of a front bumper of the host vehicle, providing more accurate threat number calculations based on times determined by different points of the host vehicle meeting the target vehicle. Thus, the computer of the host vehicle can more readily respond to target vehicles when the host vehicle is in a turn.

Figure 1:
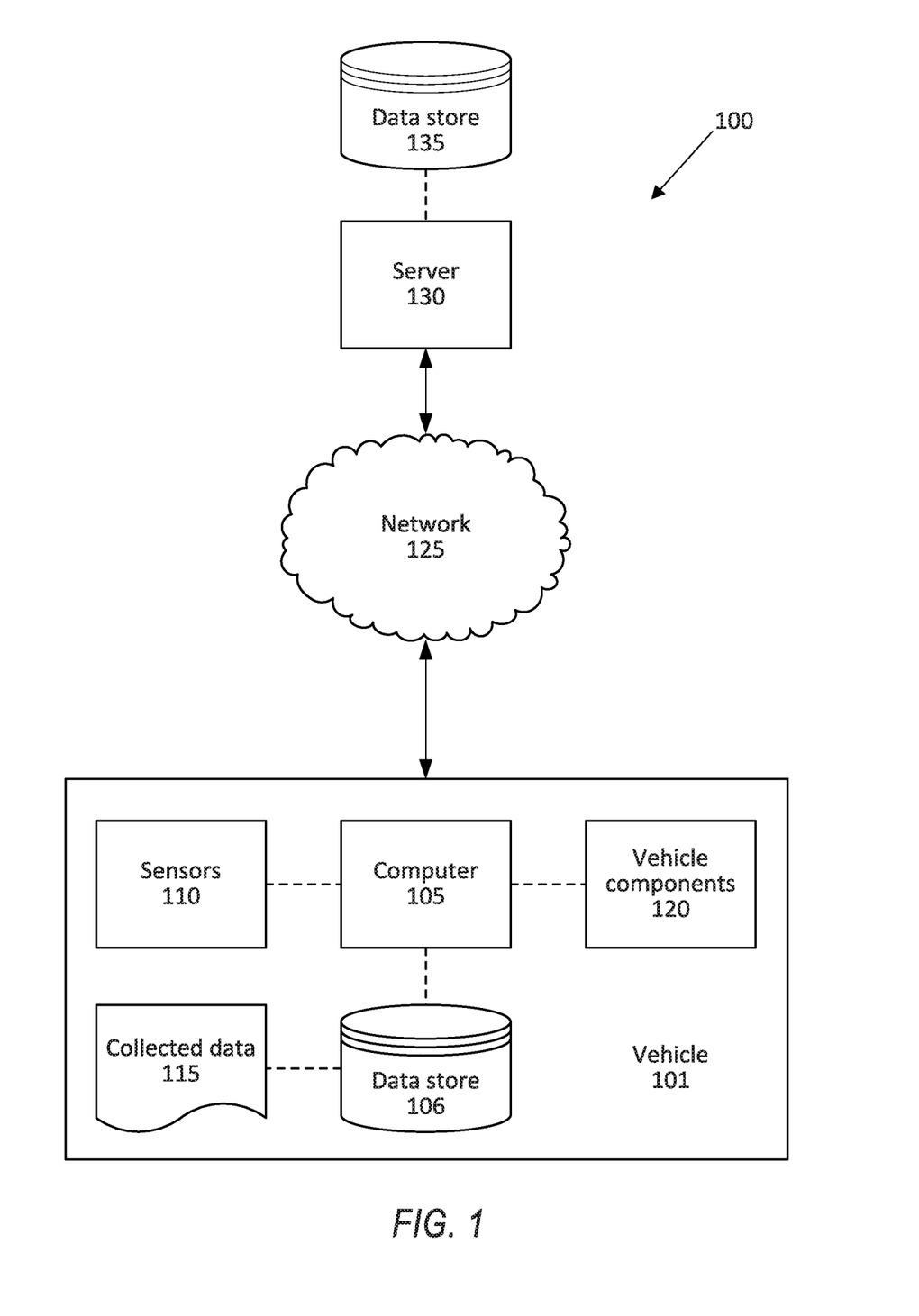
FIG. 1 is a block diagram of an example system for collision mitigation.

FIG. 1 illustrates an example system 100 for collision mitigation. A computer 105 in the vehicle 101 is programmed to receive collected data 115 from one or more sensors 110. For example, vehicle 101 data 115 may include a location of the vehicle 101, data about an environment around a vehicle, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 can be of any type, e.g., hard disk drives, solid state drives, servers, or any volatile or non-volatile media. The data store 106 can store the collected data 115 sent from the sensors 110.

Sensors 110 can include a variety of devices. For example, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a position of a component, evaluating a slope of a roadway, etc. The sensors 110 could, without limitation, also include short range radar, long range radar, LIDAR, and/or ultrasonic transducers.

Collected data 115 can include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 can include a plurality of vehicle components 120. In this context, each vehicle component 120 includes one or more hardware components adapted to perform a mechanical function or operation—such as moving the vehicle 101, slowing or stopping the vehicle 101, steering the vehicle 101, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like.

When the computer 105 operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator. In a non-autonomous mode, i.e., a manual mode, the vehicle 101 propulsion, braking, and steering are controlled by the human operator.

The system 100 can further include a network 125 connected to a server 130 and a data store 135. The computer 105 can further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
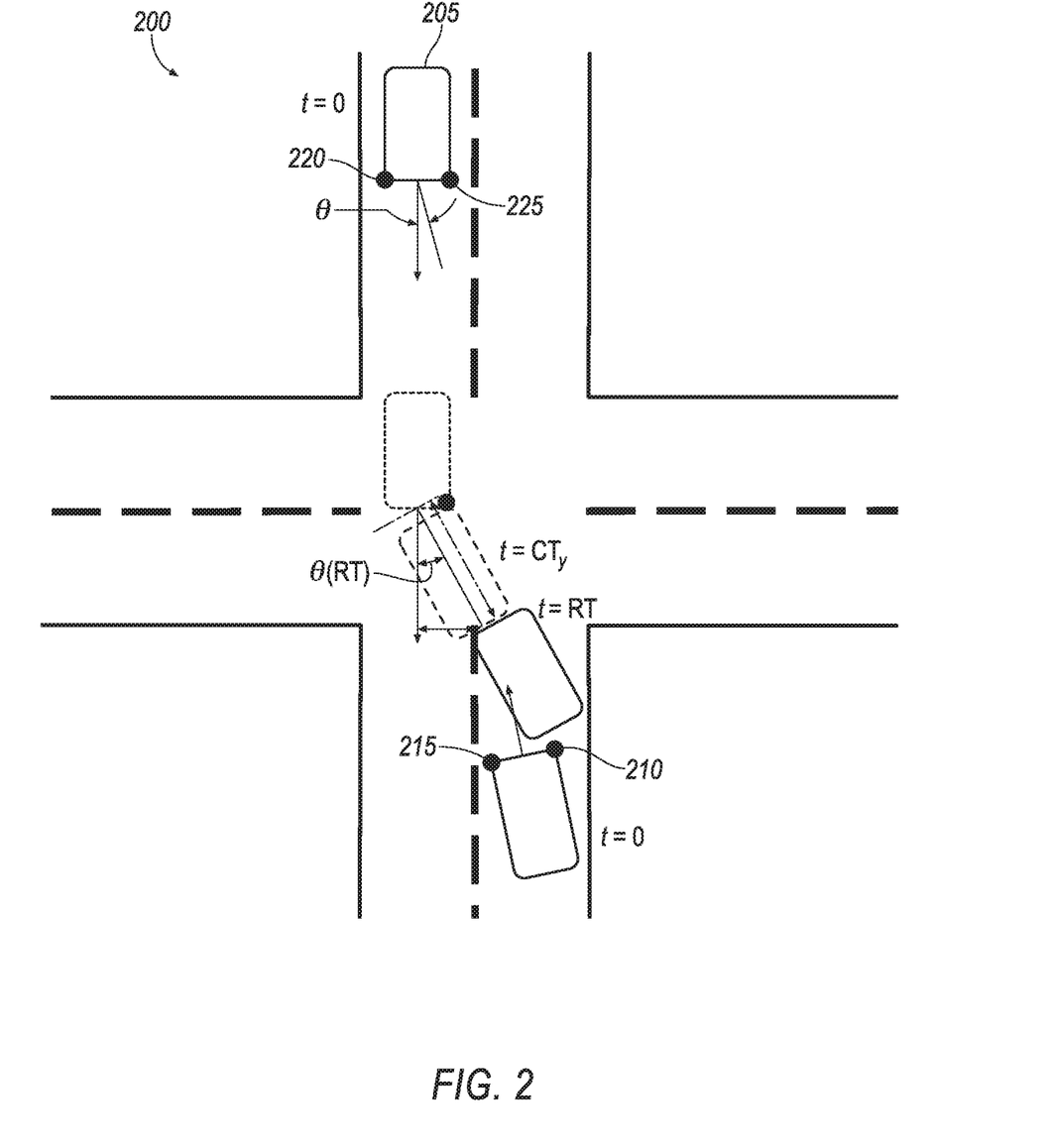
FIG. 2 is a plan view of an example intersection with a host vehicle and a target vehicle.

FIG. 2 is a plan view of an example intersection 200 including a host vehicle 101 and a target vehicle 205. As used herein, an "intersection" is defined as a location where two or more vehicles' current or potential future trajectories cross. Thus, an intersection could be at any location on a surface where two or more vehicles could collide, e.g. a road, a driveway, a parking lot, an entrance to a public road, driving paths, etc. Accordingly, an intersection is determined by identifying an area where two or more vehicles may meet, i.e., collide. The size of the area defining the intersection can be specified to encompass an area in which collisions may occur, e.g., based on a number of roadway lanes, a roadway lane size, a vehicle size, location data of prior collisions, etc. For example, the intersection can encompass 400 m$^2$ to account for the meeting of two adjacent roadway lanes and two transverse roadway lanes. Such determination uses potential future trajectories of a host vehicle 101 as well as nearby other vehicles and/or other objects.

The host vehicle 101 can perform a "turn." As used herein, a "turn" is a path along which the host vehicle 101 travels from a current roadway lane to a transverse roadway lane. For example, the host vehicle 101 can perform a turn into a roadway lane perpendicular to a current roadway lane, i.e., a left turn or a right turn. As the host vehicle 101 performs a turn, the host vehicle 101 may collide with the target vehicle 205. For example, in an OnComing Turn-Across Path (OCTAP) scenario, the host vehicle 101 turns across a predicted path of the target vehicle 205 in an adjacent roadway lane.

The computer 105 in the host vehicle 101 defines a coordinate system, e.g., a two-dimensional rectangular coordinate system. The coordinate system defines a lateral direction X and a longitudinal direction Y and an origin at a center point O of the host vehicle 101. The longitudinal direction Y is a vehicle-forward direction, i.e., the direction in which a propulsion 120 moves the vehicle 101 when a steering component 120 is at a neutral position. The lateral direction X is perpendicular to the longitudinal direction Y. The host vehicle 101 has a length $H_L$, i.e., a distance measure of the host vehicle 101 in the longitudinal direction Y, and a width $H_W$, i.e., a distance measure of the host vehicle 101 in the lateral direction X.

The computer 105 can determine a relative heading angle θ between the host vehicle 101 and the target vehicle 205. In this context, the "relative heading angle" is an angle defined between a line extending from a front center point of the host vehicle 101 and a front center point of the target vehicle 205 and a line extending in a vehicle forward direction from the front center point of the target vehicle 205. The computer 105 can determine the relative heading angle θ based on data 115 collected from one or more sensors 110, e.g., radar, lidar, etc.

The host vehicle 101 has two front corner points 210, 215. The "corner points" are corners of a rectangle representing the host vehicle 101. The "front" corner points are points along the frontmost edge of the rectangle representing the host vehicle 101. The front corner points 210, 215 of the host vehicle 101 are most likely to collide with the target vehicle 205 during the turn. The front corner points 210, 215 are a front right corner point 210 and a front left corner point 215. The target vehicle 205 has respective front corner points 220, 225, including a front right corner point 220 and a front left corner point 225.

The computer 105 can specify one of the front corner points 220, 225 of the target vehicle 205 based on a direction of the turn of the host vehicle 101. That is, based on how the host vehicle 101 is turning, the host vehicle 101 would be closer to one of the front corner points 220, 225 during the turn, and the host vehicle 101 is more likely to collide with the target vehicle 205 at one of the front corner points 220, 225. The host vehicle 101 turns "left" when a yaw rate ω, of the host vehicle 101 is positive, and the host vehicle 101 turns "right" when the yaw rate ω is negative.

The computer 105 can determine a lateral distance between one of the front corner points 210, 215 of the host vehicle 101 and one of the front corner points 220, 225 of the target vehicle 205. The computer 105 can determine a longitudinal distance between one of the front corner points 210, 215 of the host vehicle 101 and one of the front corner points 220, 225 of the target vehicle 205. That is, the computer 105 can determine the lateral distance and the longitudinal distance between the front corner points 210, 215 and the specified front corner point 220, 225 of the target vehicle 205:

$$\tilde{y}_{T_l H_l} = \tilde{y} + \frac{1}{2} T_w \cdot \sin(\theta) \tag{1}$$

-continued $$\tilde{x}_{T_l H_l} = \tilde{x} - \frac{1}{2} T_w \cdot \cos(\theta) + \frac{1}{2} H_w \tag{2}$$

$$\tilde{y}_{T_l H_r} = \tilde{y} + \frac{1}{2} T_w \cdot \sin(\theta) \tag{3}$$

$$\tilde{x}_{T_l H_r} = \tilde{x} - \frac{1}{2} T_w \cdot \cos(\theta) - \frac{1}{2} H_w \tag{4}$$

$$\tilde{y}_{T_r H_r} = \tilde{y} + \frac{1}{2} T_w \cdot \sin(\theta) \tag{5}$$

$$\tilde{x}_{T_r H_r} = \tilde{x} - \frac{1}{2} T_w \cdot \cos(\theta) - \frac{1}{2} H_w \tag{6}$$

$$\tilde{y}_{T_r H_l} = \tilde{y} + \frac{1}{2} T_w \cdot \sin(\theta) \tag{7}$$

$$\tilde{x}_{T_r H_l} = \tilde{x} - \frac{1}{2} T_w \cdot \cos(\theta) + \frac{1}{2} H_w \tag{8}$$

where $H_r$ is the right corner point 210 of the host vehicle 101, $H_l$ is the left corner point 215 of the host vehicle 101, $T_r$ is the right corner point 220 of the target vehicle 205, $T_l$ is the left corner point 225 of the target vehicle 205, $H_w$ is the width of the host vehicle 205, $T_w$ is the width of the target vehicle 205, θ is the relative heading angle, as described above, $\tilde{x}$ is the lateral position of the target vehicle 205 relative to the host vehicle 101 in the coordinate system, $\tilde{y}$ is the longitudinal position of the target vehicle 205 relative to the host vehicle 101 in the coordinate system, $$\tilde{x}_{T_{l,r} H_{l,r}}$$

is the relative lateral position of the respective corner point 210, 215 of the host vehicle 101 and the respective corner point 220, 225 of the target vehicle 205 (the specific corner point identified by the subscripts l and r), and $$\tilde{y}_{T_{l,r} H_{l,r}}$$

is the relative longitudinal position of the respective corner point 210, 215 of the host vehicle 101 and the respective corner point 220, 225 of the target vehicle 205.

The computer 105 can determine a respective longitudinal velocity $V_{Hc}$ of each corner point 210, 215 of the host vehicle 101. The longitudinal velocity $V_{Hc}$ is the component of the velocity of the corner point 210, 215 in the longitudinal direction y. The computer 105 can determine the longitudinal velocity $V_{Hc}$ based on the specified corner point 220, 225 of the target vehicle 205. That is, because the corner points 210, 215 of the host vehicle 101 have different longitudinal positions relative to the target vehicle 205, the relative velocities between the corner points 210, 215 of the host vehicle 101 and the corner points 220, 225 of the target vehicle 205 differ, specifically, based on the direction (i.e., left or right) of the corner points 210, 215, 220, 225. If the direction of the corner point 210, 215 of the host vehicle 101 is the same direction as the corner point 220, 225 of the target vehicle 205 (i.e., the right corner points 210, 220 or the left corner points 215, 225), the longitudinal velocity $V_{Hc}$ of the corner point 210, 215 is:

$$V_{Hc} = V_{H,long} - \omega \cdot \frac{1}{2} H_w \quad (9)$$

where $V_{H,long}$ is the longitudinal velocity of the host vehicle 101. If the directions of the corner points differ (i.e., the right corner point 210 and the left corner point 225), the longitudinal velocity of the corner point 210, 215 is:

$$V_{Hc} = V_{H,long} + \omega \cdot \frac{1}{2} H_w \quad (10)$$

The computer 105 can determine a respective collision time of each corner point 210, 215 of the host vehicle 101 with each corner point 220, 225 of the target vehicle 205. The "collision time" is a predicted time for one of the corner points 210, 215 of the host vehicle 101 to attain a same position as one of the corner points 220, 225 of the target vehicle 205, i.e., the time at which the corner point 210, 215 collides with the corner point 220, 225. The computer 105 can determine the collision times for each pair of corner points 210, 215, 220, 225:

$$CT_{T_l H_l} = \sqrt{\left(\frac{\tilde{y}_{T_l H_l}}{V_{Hc} - \dot{\tilde{y}}}\right)^2 + \left(\frac{\tilde{x}_{T_l H_l}}{V_{H,lat} - \dot{\tilde{x}}}\right)^2} \quad (11)$$

$$CT_{T_l H_r} = \sqrt{\left(\frac{\tilde{y}_{T_l H_r}}{V_{Hc} - \dot{\tilde{y}}}\right)^2 + \left(\frac{\tilde{x}_{T_l H_r}}{V_{H,lat} - \dot{\tilde{x}}}\right)^2} \quad (12)$$

$$CT_{T_r H_l} = \sqrt{\left(\frac{\tilde{y}_{T_r H_l}}{V_{Hc} - \dot{\tilde{y}}}\right)^2 + \left(\frac{\tilde{x}_{T_r H_l}}{V_{H,lat} - \dot{\tilde{x}}}\right)^2} \quad (13)$$

$$CT_{T_r H_r} = \sqrt{\left(\frac{\tilde{y}_{T_r H_r}}{V_{Hc} - \dot{\tilde{y}}}\right)^2 + \left(\frac{\tilde{x}_{T_r H_r}}{V_{H,lat} - \dot{\tilde{x}}}\right)^2} \quad (14)$$

where CT is the respective collision time of one of the corner points 210, 215 and one of the corner points 220, 225, $V_{H,lat}$ is the lateral velocity of host vehicle 101, $\dot{\tilde{x}}$ is the relative lateral velocity of the target vehicle 205, and $\dot{\tilde{y}}$ is the relative longitudinal velocity of the target vehicle 205. The computer 105 identifies the corner points 210, 215, 220, 225 having a lowest collision time CT, i.e., the lowest value for CT of the above equations identifies one of the corner points 210, 215 of the host vehicle 101 and one of the corner points 220, 225 of the target vehicle 205 that are predicted to collide first during the turn. The computer 105 can determine the reach time RT described below based on the identified pair of corner points 210, 215, 220, 225. Additionally, the computer 105 can determine the reach time RT upon determining that the host vehicle 101 is turning toward the target vehicle 205, as described below, to reduce false positive identifications when the host vehicle 101 is turning away from the target vehicle 205.

The computer 105 can determine a longitudinal collision time $CT_y$ for the corner point 210, 215. The longitudinal collision time $CT_y$ is the time for the longitudinal position $\tilde{y}_c$ to reach zero, i.e., for the longitudinal position of the corner point 210, 215 to match the longitudinal position the target vehicle 205. In general, the longitudinal position $\tilde{y}_c$ of the corner point 210, 215 at a time t can be determined as the solution to a 4th order polynomial:

$$\tilde{y}_c(t) = \frac{a_H \omega^2}{8} \cdot t^4 + \frac{V_{Hc} \omega^2}{6} \cdot t^3 + \frac{\ddot{\tilde{y}}_T}{2} \cdot t^2 + \dot{\tilde{y}}_T \cdot t + \tilde{y}_{c,0} \quad (15)$$

where $a_H$ is the longitudinal acceleration of the host vehicle 101, $\dot{\tilde{y}}_T$ is the relative longitudinal velocity of the target vehicle 205, and $\ddot{\tilde{y}}_T$ is the relative longitudinal acceleration of the target vehicle 205, and $\tilde{y}_{c,0}$ is the longitudinal position of the corner point 210, 215 at an initiation of data collection, i.e., when t=0. The longitudinal collision time $CT_y$ is the smallest positive real root of $$\tilde{y}_c(CT_y)=0 \quad (16)$$

The computer 105 can determine a reach time RT for the corner point 210, 215. The "reach time" is a time to reach a longitudinal distance threshold that is based on a relative heading angle between the host vehicle 101 and the target vehicle 205, as described in more detail below. That is, the reach time RT considers the respective lengths and widths of the host vehicle 101 and the target vehicle 205 and the heading angle between the host vehicle 101 and the target vehicle 205 to determine whether the corner point 210, 215 will rotate into the path of the target vehicle 205. The computer 105 can use the smaller of the collision time $CT_y$ and the reach time RT for threat assessment.

The computer 105 can predict a relative heading angle θ(RT) between the host vehicle 101 and the target vehicle 205 at the reach time RT:

$$\theta(RT) = \theta + \omega \cdot CT_y - k \cdot V_{H,long} \cdot \omega \quad (17)$$

where k is a tunable parameter based on a host vehicle 101 speed $V_H$ determined from empirical test data to compensate for a difference between a predicted heading angle θ at the collision time $CT_y$ and the reach time RT. The parameter k can be stored as e.g., a lookup table, a function, or the like, in the data store 106. Example values for k are shown in Table 1 below:

TABLE 1

| $V_H$ (m/s) | 2.8 | 4.2 | 5.6 |
|---|---|---|---|
| k | 1.2 | 0.9 | 0.6 |

The computer 105 can determine a longitudinal distance threshold $Y_{threshold}$ based on the longitudinal collision time $CT_y$. The longitudinal distance threshold $Y_{threshold}$ is a threshold at which the host vehicle 101 should stop to avoid entering a path of the target vehicle 205. The longitudinal distance threshold $Y_{threshold}$ can be determined based on the heading angle θ (RT):

$$Y_{threshold} = \max\left(\left|\frac{\frac{1}{2} H_w \cdot \cos(\theta(RT)) + \frac{1}{2} T_w + marg(V_H)}{\sin(\theta(RT))}\right|, \overline{Y}(V_H)\right) \quad (18)$$

where $marg(V_H)$ is an adaptive lateral margin distance that is a function of the host vehicle 101 speed $V_H$ an $\overline{Y}(V_H)$ is a maximum threshold value that is a function of the host vehicle 101 speed $V_H$. The maximum threshold value $\overline{Y}(V_H)$ can be determined based on empirical testing of vehicles 101, 205 at intersections 200. Example values of the maximum threshold $\overline{Y}(V_H)$ can be, e.g., 10 meters when $V_H$>3.3 m/s and 12 meters when $V_H \leq 3.3$ m/s. The margin distance marg($V_H$) can be stored as e.g., a lookup table, a function, or the like, in the data store 106. Example values of marg($V_H$) are shown in Table 2 below:

TABLE 2

| $V_H$ (m/s) | 2.8 | 4.2 | 5.6 |
|---|---|---|---|
| marq($V_H$) | 1.0 | 0.7 | 0.6 |

The computer 105 can determine the reach time RT as the smallest positive real root of Equation (15) at the longitudinal distance threshold $Y_{threshold}$:

$$\tilde{y}_c(RT) = Y_{threshold} \quad (19)$$

Upon determining the reach time RT, the computer 105 can predict a lateral offset $x_{off}$ as the lateral position $\tilde{x}$ at the reach time RT with a conventional vehicle kinematic model, e.g., a CTRA model.

The computer 105 can determine a threat number TN based on the lower of the collision time $CT_y$ and the reach time RT. A threat number is a prediction of whether a specific target 205 will intersect or collide with the host vehicle 101. Specifically, the computer 105 may determine an acceleration threat number ATN, a brake threat number BTN, and a steering threat number STN for the host vehicle 101 and the target 205, and based on the threat numbers ATN, BTN, STN, which may be combined into a single threat number TN, to actuate components 120. In one non-limiting example, the BTN, STN, and ATN can be determined in a manner described in U.S. patent application Ser. No. 15/005,037, U.S. Pat. No. 9,610,945, filed Jan. 25, 2016, which is incorporated herein by reference in its entirety. That is, the computer 105 can determine one of a deceleration to slow or stop the host vehicle 101 prior to the lower of the collision time $CT_y$ and the reach time RT, a lateral acceleration to steer the host vehicle 101 away from the target 205 prior to the lower of the collision time $CT_y$ and the reach time RT, or an acceleration to propel the host vehicle 101 past the target 205 prior to the lower of the collision time $CT_y$ and the reach time RT.

The BTN is a measure of a needed longitudinal deceleration to allow the host vehicle 101 to stop before colliding with the target vehicle 205. The BTN can be based on a measured host vehicle 101 speed, a distance between the target vehicle 205 and the host vehicle 101, and the respective projected trajectories of the target vehicle 205 and the host vehicle 101. The computer 105 can determine a longitudinal deceleration to stop the host vehicle 101 before colliding with the target vehicle 205, e.g., 2 m/s². The computer 105 can determine a maximum deceleration of the host vehicle 101, e.g., 8 m/s². The BTN can be the ratio of the needed deceleration to the maximum deceleration, e.g., BTN=2/8=0.25. The needed deceleration can be a zero-range deceleration, i.e., a deceleration determined by a path-planning algorithm to stop the host vehicle 101 at a specified point to avoid a collision with the target 205. The computer 105 can identify the specified point as a point outside of a projected path of the target 205. If the needed deceleration to avoid a collision with the target vehicle 205 exceeds the maximum deceleration of the host vehicle 101, i.e., BTN>1, then the computer 105 can set the value of the BTN to 1, i.e., if BTN>1, BTN=1.

The STN is a measure of a needed lateral acceleration to allow the host vehicle 101 to steer away from the target vehicle 205. For example, the STN can be a measure of the lateral acceleration to steer the host vehicle 101 away from the target vehicle 205 in a direction opposite to a direction of travel of the host vehicle 101. That is, when the host vehicle 101 is in a left-hand turn, the STN is based on the lateral acceleration to steer the host vehicle 101 to the right away from the target vehicle 205. As with the BTN, the computer 105 can determine a needed lateral acceleration to avoid a collision between the host vehicle 101 and the target vehicle 205. The STN can be the ratio of the needed lateral acceleration to a maximum lateral acceleration of the host vehicle 101. If the needed lateral acceleration exceeds the maximum lateral acceleration, the computer 105 can set the STN to 1.

The ATN is a measure of a needed longitudinal acceleration to allow the host vehicle 101 to accelerate and pass the target vehicle 205. As described above for the BTN and the STN, the computer 105 can determine a needed acceleration to allow the host vehicle 101 to pass the target vehicle 205 and a maximum available acceleration of the host vehicle 101 as specified by a manufacturer. The ATN can be the ratio of the needed longitudinal acceleration to the maximum longitudinal acceleration of the host vehicle 101. If the needed longitudinal acceleration exceeds a maximum longitudinal acceleration, the computer 105 can set the ATN to 1. The computer 105 may determine the STN, BTN, and/or ATN to produce a respective overall threat number TN for the target vehicle 205.

The computer 105 can actuate one or more vehicle components 120 based on the threat number TN, e.g., when the threat number TN is above a predetermined threat number threshold. The computer 105 can actuate one or more components 120 based on a comparison of the threat number to a plurality of thresholds. The thresholds can be determined as, e.g., specifications from a manufacturer, results of simulation testing of virtual host vehicle 101 and virtual target vehicle 205 trajectories, empirical testing of vehicle components 120 of the host vehicle 101 during a collision test, etc. For example, if the threat number TN is above 0.7, the computer 105 can actuate a brake 120 to decelerate the host vehicle 101, e.g., at −6.5 meters per second squared (m/s²). In another example, if the threat number TN is above 0.4 but less than or equal to 0.7, the computer 105 can actuate the brake 120 to, e.g., a deceleration of −2.0 m/s². In another example, if the threat number TN is greater than 0.2 but less than or equal to 0.4, the computer 105 can display a visual warning on a host vehicle 101 human-machine interface and/or play an audio warning over a speaker.

To reduce actuation of components 120 when a collision is not likely (referred to as a false positive, or false positive actuation), the computer 105 can determine the reach time RT when one or more conditions are satisfied. The conditions can be determined such that the computer 105 determines the reach time RT in specific scenarios, e.g., OCTAP scenarios. One of the conditions can be a lane offset condition that is satisfied when a yaw rate $\omega_h$ of the host vehicle 101 at an initiation of a turn is below a yaw rate threshold and a lateral position $\tilde{x}_{tg}$ of the target vehicle 205 is below a lateral position threshold, the thresholds determined based on empirical testing of vehicles 101, 205 such that the condition is only satisfied when the target vehicle 205 is no more than one roadway lane away from the host vehicle 101 and the host vehicle 101 is turning into another roadway lane. Another condition can be a speed condition that is satisfied when the speed of the host vehicle 101 is below a speed threshold, e.g., 30 kph. The speed threshold can be determined based on empirical testing of vehicles 101, 205 in intersections 200.

Another condition can be a heading angle prediction. The computer 105 can predict heading angle θ, as described above, at the collision time $CT_y$. When the host vehicle 101 and the target vehicle 205 are moving substantially parallel to each other, the host vehicle 101 is not likely in a turn across the path of the target vehicle 205 and the computer 105 should not actuate components 120 based on the reach time RT. The heading angle prediction can be satisfied when a difference between the predicted heading angle θ and 180 degrees (i.e., the host vehicle 101 is moving parallel to the target vehicle 205) is above an angle threshold, e.g., 10 degrees. The angle threshold can be determined based on empirical testing of vehicles 101, 205 in intersections 200.

Another condition can be a direction condition. The computer 105 should only actuate the components 120 when the host vehicle 101 is turning across the path of the target vehicle 205, i.e., the host vehicle 101 is turning toward the target vehicle 205. The computer 105 can compare a position of the target vehicle 205 relative to the host vehicle 101 and a direction that the host vehicle 101 is turning. The direction condition is satisfied when the position of the target vehicle 205 matches the direction (i.e., left or right) that the host vehicle 101 is turning, i.e., when the computer 105 identifies that the target vehicle 205 is to the left of the host vehicle 101 and the host vehicle 101 is turning left or when the computer 105 identifies that the target vehicle 205 is to the right of the host vehicle 101 and the host vehicle 101 is turning right. The computer 105 can identify the position of the target vehicle 205 based on, e.g., image data, a lateral position $\tilde{x}$, etc. The computer 105 can identify the direction of the turn as the sign of the yaw rate $\omega_h$ of the host vehicle 101, i.e., a positive yaw rate $\omega_h$ causes the host vehicle 101 to turn to the left, and a negative yaw rate $\omega_h$ causes the host vehicle 101 to turn to the right.

Another condition can be a reach time heading angle condition. The computer 105 can predict the heading angle θ at the reach time RT, as described above. The reach time heading angle conditions is satisfied when a difference between the predicted heading angle θ at the reach time RT and 180 degrees (i.e., the host vehicle 101 is moving parallel to the target vehicle 205) is above an angle threshold, e.g., 10 degrees. The angle threshold can be determined based on empirical testing of vehicles 101, 205 in intersections 200. That is, as with the heading angle condition, the computer 105 can reduce false positive identifications when the host vehicle 101 is moving substantially parallel to the target vehicle 205 and the host vehicle 101 is not likely in a turn across the path of the target vehicle 205.

Figure 3:
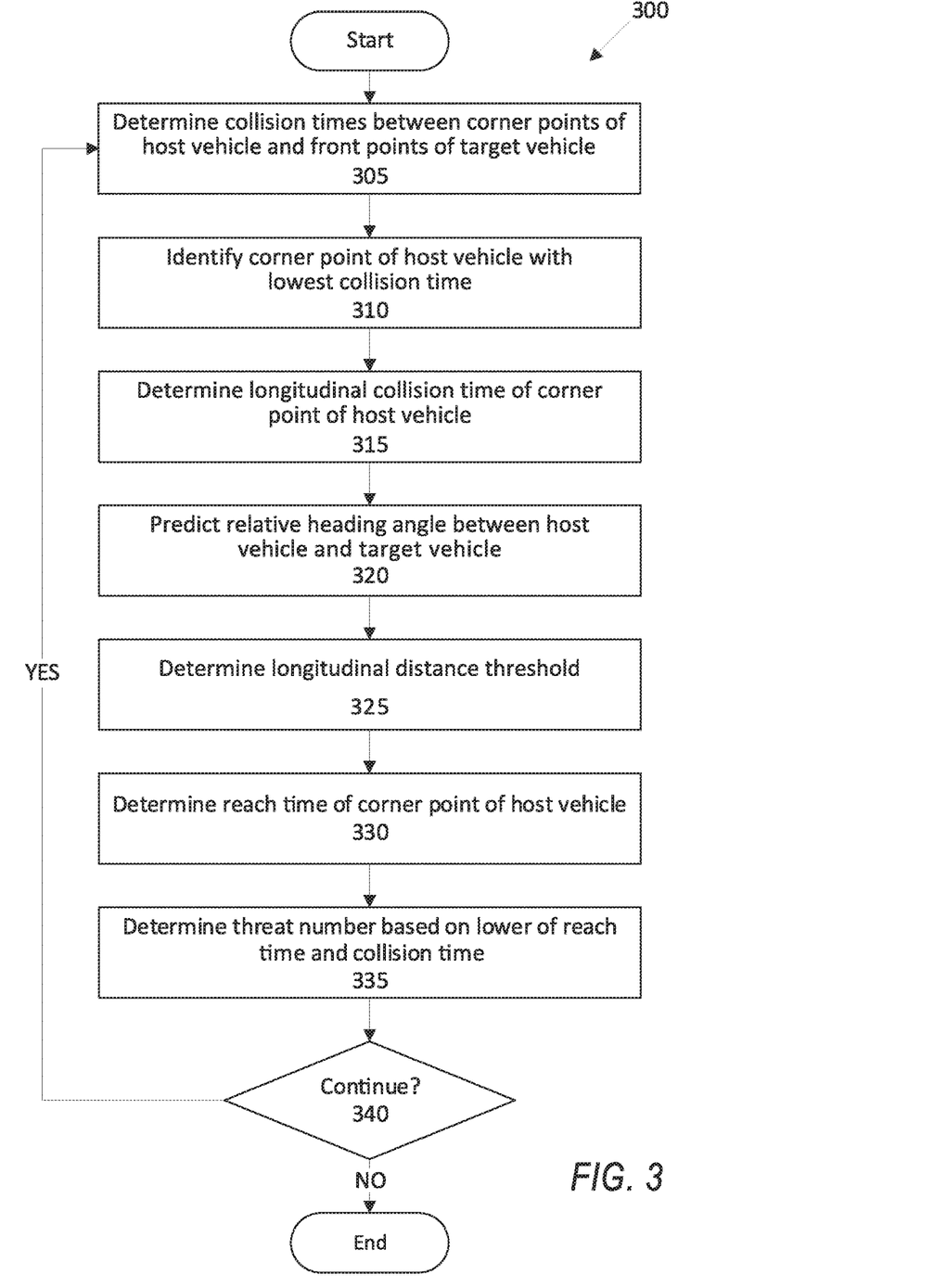
FIG. 3 is a block diagram of an example process for collision mitigation.

FIG. 3 is a block diagram of an example process 300 for collision mitigation at an intersection 200. The process 300 begins in a block 305, in which a computer 105 in a host vehicle 101 determines respective collision times CT between corner points 210, 215 of the host vehicle 101 and corner points 220, 225 of a target vehicle 205. As described above, the computer 105 collects data 115 about the host vehicle 101 and the target vehicle 205 and determines the collision times to determine which of the corner points 210, 215 will first collide with one of the corner points 220, 225.

Next, in a block 310, the computer 105 identifies the corner point 210, 215 of the host vehicle 101 with the lowest collision time CT. The corner point 210, 215 with the lowest collision time CT represents the corner of the host vehicle 101 that will likely collide with the target vehicle 205 first as the host vehicle 101 moves in the intersection 200. Thus, the computer 105 can perform collision mitigation for the identified corner point 210, 215.

Next, in a block 315, the computer 105 determines a longitudinal collision time $CT_y$ for the identified corner point 210, 215. As described above, the longitudinal collision time $CT_y$ is the time for the longitudinal position $\tilde{y}_c$ of the corner point 210, 215 to reach zero, i.e., for the longitudinal position of the corner point 210, 215 to match the longitudinal position the target vehicle 205. The computer 105 can determine the longitudinal collision time $CT_y$ based on a fourth-order polynomial describing the longitudinal position $\tilde{y}_c$, as described above.

Next, in a block 320, the computer 105 predicts a relative heading angle θ (RT) between the host vehicle 101 and the target vehicle 205. The relative heading angle θ(RT) is an angle defined between a line extending from a front corner point 210, 215 of the host vehicle 101 and a front corner point 220, 225 of the target vehicle 205 and a line extending in a vehicle forward direction from the front corner point 220, 225 of the target vehicle 205. The computer 105 can determine the relative heading angle θ(RT) based on data 115 collected from one or more sensors 110, e.g., radar, lidar, etc., as described above.

Next, in a block 325, the computer 105 determines a longitudinal distance threshold $Y_{threshold}$ The longitudinal distance threshold $Y_{threshold}$ is a threshold at which the host vehicle 101 should stop to avoid entering a path of the target vehicle 205. The computer 105 determines the longitudinal distance threshold $Y_{threshold}$ based on the longitudinal collision time $CT_y$ and the relative heading angle θ(RT).

Next, in a block 330, the computer 105 determines a reach time RT for the corner point 210, 215. The reach time RT is a time to reach the longitudinal distance threshold $Y_{threshold}$, as described above. The computer 105 determines the reach time RT as the time at which the longitudinal position $\tilde{y}_c$ is the longitudinal distance threshold $Y_{threshold}$.

Next, in a block 335, the computer 105 determines a threat number TN based on the lower of the longitudinal collision time $CT_y$ and the reach time RT. Specifically, the computer 105 may determine an acceleration threat number ATN, a brake threat number BTN, and a steering threat number STN for the host vehicle 101 and the target 205 based on the lower of the collision time $CT_y$ and the reach time RT. Based on the threat numbers ATN, BTN, STN, the computer 105 can actuate components 120 to mitigate a collision with the target 205. For example, if the threat number TN is a brake threat number BTN, the computer 105 can apply a brake 120 to allow the target 205 to pass. In another example, if the threat number TN is a steering threat number STN, the computer 105 can actuate a steering motor 120 to steer the host vehicle 101 away from the target 205. In another example, if the threat number TN is an acceleration threat number ATN, the computer 105 can actuate a propulsion 120 to accelerate the host vehicle 101 past the target 205. By using the lower of the longitudinal collision time $CT_y$ and the reach time RT, the threat number TN accounts for changes to vehicle motion during the turn in the intersection 200.

Next, in a block 340, the computer 105 determines whether to continue the process 300. For example, the computer 105 can determine to continue the process 300 when the host vehicle 101 enters another intersection 200 to perform a turn. If the computer 105 determines to continue, the process 300 returns to the block 305. Otherwise, the process 300 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computing devices discussed herein, including the computer 105 and server 130, include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 300, one or more of the steps could be omitted, or the steps could be executed in a different order than shown in FIG. 3. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory including instructions executable by the processor to:
    predict a collision time between a corner point of a host vehicle and a target vehicle, the collision time being a predicted time at which the corner point of the host vehicle attains a same position as the target vehicle;
    predict a relative heading angle between the host vehicle and the target vehicle based on the collision time;
    predict a reach time for the corner point of the host vehicle based on the predicted relative heading angle, the reach time being a predicted time at which the corner point of the host vehicle reaches a longitudinal distance threshold;
    determine a threat number based on the lower of the collision time and the reach time; and
    actuate a vehicle component based on the threat number.

2. The system of claim 1, wherein the instructions further include instructions to determine the longitudinal distance threshold based on the predicted relative heading angle and to predict the reach time based on the longitudinal distance threshold.

3. The system of claim 1, wherein the instructions further include instructions to predict respective collision times between a plurality of corner points of the host vehicle and a plurality of corner points of the target vehicle, to identify the corner point of the host vehicle having the lowest collision time with one of the corner points of the target vehicle, and to predict the reach time for the identified corner point of the host vehicle.

4. The system of claim 1, wherein the instructions further include instructions to determine the collision time based on a longitudinal distance between the corner point of the host vehicle and the target vehicle and a lateral distance between the corner point of the host vehicle and the target vehicle.

5. The system of claim 1, wherein the instructions further include instructions to actuate a brake based on the threat number.

6. The system of claim 1, wherein the instructions further include instructions to determine the collision time based on a yaw rate of the host vehicle.

7. The system of claim 1, wherein the threat number is one of a brake threat number or a steering threat number.

8. The system of claim 1, wherein the instructions further include instructions to determine the collision time between the corner point of the host vehicle and a corner point of the target vehicle.

9. The system of claim 1, wherein the collision time is a longitudinal collision time.

10. A method, comprising:
    predicting a collision time between a corner point of a host vehicle and a target vehicle, the collision time being a predicted time at which the corner point of the host vehicle attains a same position as the target vehicle;
    predicting a relative heading angle between the host vehicle and the target vehicle based on the collision time;

predicting a reach time for the corner point of the host vehicle based on the predicted relative heading angle, the reach time being a predicted time at which the corner point of the host vehicle reaches a longitudinal distance threshold;

determining a threat number based on the lower of the collision time and the reach time; and actuating a vehicle component based on the threat number.

11. The method of claim 10, further comprising determining the longitudinal distance threshold based on the predicted relative heading angle and to predict the reach time based on the longitudinal distance threshold.

12. The method of claim 10, further comprising predicting respective collision times between a plurality of corner points of the host vehicle and a plurality of corner points of the target vehicle, identifying the corner point of the host vehicle having the lowest collision time with one of the corner points of the target vehicle, and predicting the reach time for the identified corner point of the host vehicle.

13. The method of claim 10, further comprising determining the collision time based on a longitudinal distance between the corner point of the host vehicle and the target vehicle and a lateral distance between the corner point of the host vehicle and the target vehicle.

14. The method of claim 10, further comprising actuating a brake based on the threat number.

15. A system, comprising:

a host vehicle including a brake;

means for predicting a collision time between a corner point of the host vehicle and a target vehicle, the collision time being a predicted time at which the corner point of the host vehicle attains a same position as the target vehicle;

means for predicting a relative heading angle between the host vehicle and the target vehicle based on the collision time;

means for predicting a reach time for the corner point of the host vehicle based on the predicted relative heading angle, the reach time being a predicted time at which the corner point of the host vehicle reaches a longitudinal distance threshold;

means for determining a threat number based on the lower of the collision time and the reach time; and means for actuating the brake based on the threat number.

16. The system of claim 15, further comprising means for determining the longitudinal distance threshold based on the predicted relative heading angle and to predict the reach time based on the longitudinal distance threshold.

17. The system of claim 15, further comprising means for predicting respective collision times between a plurality of corner points of the host vehicle and a plurality of corner points of the target vehicle, means for identifying the corner point of the host vehicle having the lowest collision time with one of the corner points of the target vehicle, and means for predicting the reach time for the identified corner point of the host vehicle.

18. The system of claim 15, further comprising means for determining the collision time based on a longitudinal distance between the corner point of the host vehicle and the target vehicle and a lateral distance between the corner point of the host vehicle and the target vehicle.

19. The system of claim 15, further comprising means for predicting the relative heading angle based on the collision time.

* * * * *